United States Patent
Walters

(10) Patent No.: US 12,359,624 B2
(45) Date of Patent: Jul. 15, 2025

(54) GAS TURBINE ENGINE

(71) Applicant: Rolls-Royce plc, London (GB)

(72) Inventor: Edward A. Walters, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 18/630,099

(22) Filed: Apr. 9, 2024

(65) Prior Publication Data

US 2024/0369020 A1 Nov. 7, 2024

(30) Foreign Application Priority Data

May 3, 2023 (GB) ...................................... 2306498

(51) Int. Cl.
*F02C 7/22* (2006.01)
*F23R 3/00* (2006.01)
*F23R 3/28* (2006.01)

(52) U.S. Cl.
CPC .............. *F02C 7/222* (2013.01); *F23R 3/002* (2013.01); *F23R 3/283* (2013.01)

(58) Field of Classification Search
CPC ........... F02C 7/222; F23R 3/002; F23R 3/283
See application file for complete search history.

(56) References Cited

U.S. PATENT DOCUMENTS

| | | | |
|---|---|---|---|
| 3,991,561 A * | 11/1976 | Leto | F02C 9/40 60/39.463 |
| 4,312,185 A | 1/1982 | Nash et al. | |
| 4,467,610 A | 8/1984 | Pearson et al. | |
| 5,771,696 A | 6/1998 | Hansel et al. | |
| 10,359,195 B2 * | 7/2019 | Roh | F23R 3/36 |
| 12,044,409 B2 * | 7/2024 | Binek | F23R 3/346 |
| 2006/0156731 A1 * | 7/2006 | Prociw | F02C 7/24 60/739 |
| 2010/0071377 A1 | 3/2010 | Fox et al. | |
| 2010/0330510 A1 * | 12/2010 | Pfefferle | F23L 15/04 431/8 |
| 2011/0056206 A1 | 3/2011 | Wiebe | |
| 2012/0243972 A1 | 9/2012 | Jain | |
| 2016/0376997 A1 | 12/2016 | Prociw et al. | |
| 2019/0309686 A1 | 10/2019 | Ryon et al. | |
| 2021/0088215 A1 | 3/2021 | Binek et al. | |

OTHER PUBLICATIONS

European search report dated Jul. 31, 2024, issued in EP Patent Application No. 24165892.1.
Great Britain search report dated Oct. 25, 2023, issued in GB Patent Application No. 2306498.3.
European Search Report dated Mar. 7, 2025, issued in EP Patent Application No. 25155567.8.

* cited by examiner

*Primary Examiner* — Lorne E Meade

(57) ABSTRACT

A gas turbine engine configured to combust gaseous hydrogen fuel comprises a combustor comprising an annular combustion chamber outer casing surrounding an inner combustor case and a fuel manifold configured to provide gaseous fuel to a plurality of fuel injectors. The fuel manifold is formed integrally with the combustion chamber outer casing.

4 Claims, 8 Drawing Sheets

GAS TURBINE ENGINE

CROSS-REFERENCE TO RELATED APPLICATIONS

This application is based upon and claims the benefit of priority from British Patent Application No. 2306498.3, filed on May 3, 2023, the entire contents of which are herein incorporated by reference.

BACKGROUND

Technical Field

This disclosure relates to a hydrogen combusting gas turbine engine.

Description of Related Art

In order to limit emissions of carbon dioxide, use of hydrogen as an alternative to hydrocarbon fuel in gas turbine engines has historically only been practical in land-based installations. However, hydrogen fueled airliners have recently been proposed.

Hydrogen combustion in aircraft gas turbines presents a number of challenges. In particular, the low storage temperature of hydrogen and the relatively high temperatures within the combustor can result in large temperature differentials, which may result in "thermal fight", where different components are contracting and expanding due to their different temperatures. Such temperature differences can cause stress in various components, affecting component life. Additionally, hydrogen is difficult to contain, as it can readily leak through joints. In view of the high flammability of hydrogen, fuel leakage in hot parts of the engine where oxygen is present can represent a significant safety hazard.

SUMMARY

The disclosure is directed towards a hydrogen combusting gas turbine engine.

In a first aspect there is provided a gas turbine engine configured to combust gaseous hydrogen fuel, the gas turbine engine comprising:
a combustor comprising an annular combustion chamber outer case surrounding an inner combustor case and a fuel manifold configured to provide gaseous fuel to a plurality of fuel injectors; wherein
the fuel manifold is formed integrally with the combustion chamber outer casing.

Advantageously, the disclosure provides a gas turbine engine having a fuel system with minimal joints, since a single fuel manifold which is integral to the combustion chamber outer casing is used to supply multiple fuel injectors.

Each fuel injector may be coupled to the fuel manifold via a coupling provided within the combustion chamber outer casing. The coupling may be provided within the inner combustor case. Advantageously, the coupling, which may be susceptible to leakage, is provided within a zone which is tolerant of the high temperatures which may be caused by leaking hydrogen combusting.

Each fuel injector may be coupled to the fuel manifold via a respective fuel feed arm. Each fuel feed arm may be integral with the fuel manifold. Advantageously, the number of joints is minimised. Alternatively, each fuel feed arm may be joined to the manifold by a coupling provided within the combustion chamber outer casing. Advantageously, any leaks occur within the combustion chamber outer casing.

Each fuel feed arm may be double walled, having an inner wall separated from an outer wall via an air gap. Advantageously, the relatively cold hydrogen fuel is insulated from the relatively hot compressor delivery air, thereby reducing thermal shock and stress. Each fuel feed arm may be mounted to an annular compressor gas washed wall of the combustion chamber outer casing by the outer wall, and may be mounted to each fuel injector by the outer wall. The fuel feed arm inner wall may have a lower stiffness than the outer wall. Advantageously, a relatively stiff mounting is provided, which also protects the inner gas tight wall from damage from Foreign Object Damage (FOD), while thermal expansion can be accommodated by the relatively less stiff inner wall.

The fuel manifold may be provided on a radially outer side of the combustion chamber outer casing annular wall. The fuel manifold may be joined to the combustion chamber outer casing by the fuel feed arm, and may be spaced from the combustion chamber outer casing by the fuel feed arm. Advantageously, the relatively cold fuel manifold is prevented from making direct contact with the annular wall of the combustion chamber outer casing.

Alternatively, the fuel manifold may be provided on a radially inner side of the combustion chamber outer casing. The combustion chamber casing, fuel manifold, feed arms and at least part of the plurality of fuel injectors may be formed integrally. Advantageously, no joints are provided upstream of the fuel injectors. Consequently, any leaks are provided within a combustion zone of the combustor.

The fuel manifold may comprise an inner and an outer wall to provide an air gap therebetween, the outer wall being washed by combustor inlet air in use. Advantageously, the air gap is provided, to shield the cold hydrogen fuel from hot combustor entry air.

The air gap may be in fluid communication with compressor air. Advantageously, the manifold inner wall is actively cooled, and any leaks are diluted by air, reducing safety hazards.

The fuel manifold may be generally toroidal. Advantageously, the high-pressure hydrogen gas is efficiently contained, and corners, which would act as stress concentrators, are avoided. Alternatively, the fuel manifold may comprise a box section. Advantageously, space within the gas turbine engine is more efficiently utilised.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
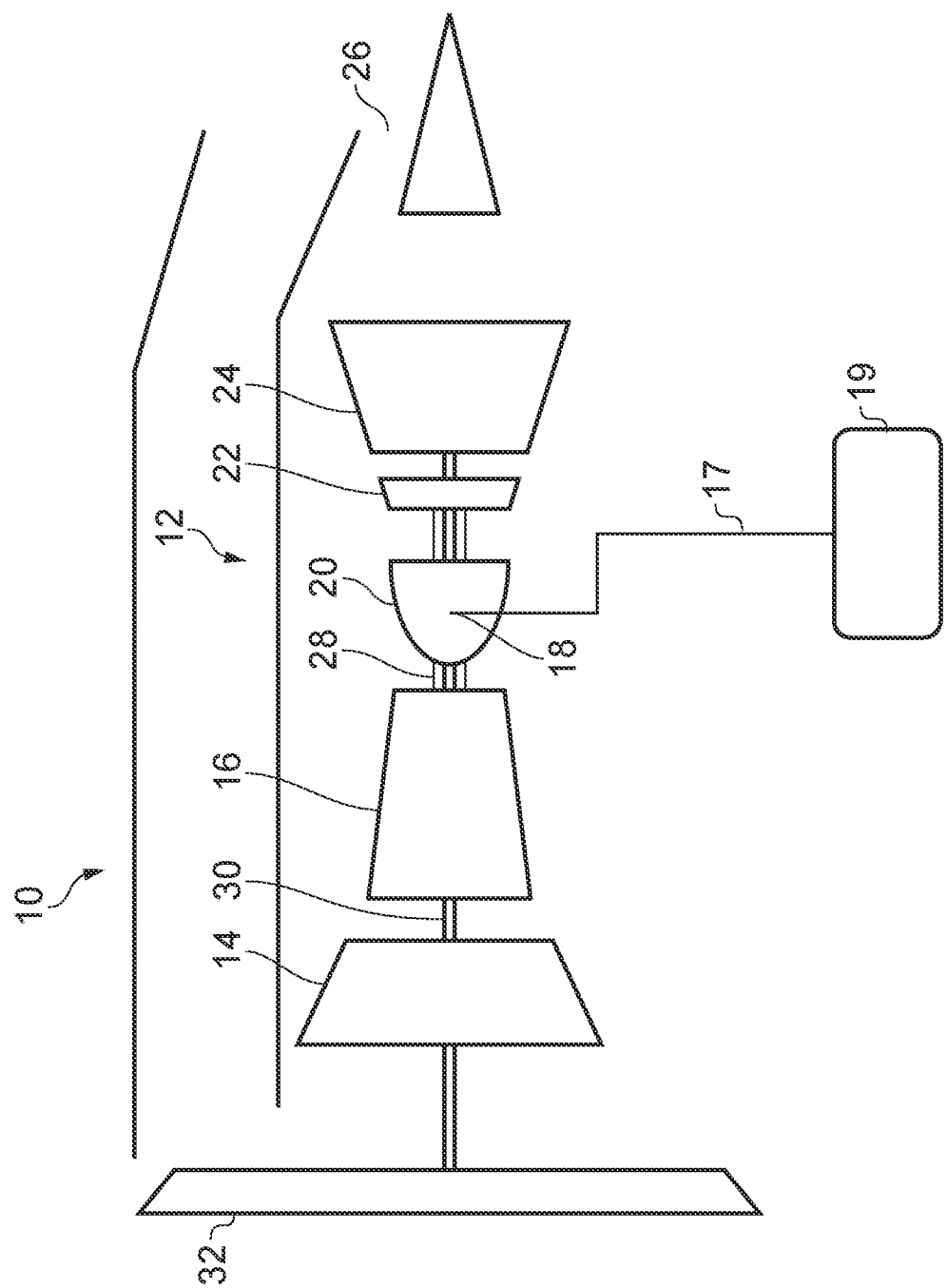
FIG. 1 shows a block diagram of a hydrogen-fueled turbofan engine.

A block diagram of a hydrogen fueled gas turbine engine 10 is shown in FIG. 1.

The gas turbine engine 10 comprises a core gas turbine 12.

The core gas turbine 12 comprises, in fluid flow series, a low-pressure compressor 14, a high-pressure compressor 16, a fuel injection system 18, a combustor 20, a high-pressure turbine 22, a low-pressure turbine 24, and a core nozzle 26. The high-pressure compressor 16 is driven by the high-pressure turbine 22 via a first shaft 28, and the low-pressure compressor 14 is driven by the low-pressure turbine 24 via a second shaft 30. The gas turbine also comprises a fan 32 driven by the second shaft 30. It will be appreciated that in alternative embodiments, the core gas turbine could be of three-shaft configuration.

In operation, hydrogen fuel is pumped through a fuel line 17 from a hydrogen storage tank 19, in either a liquid, supercritical or gaseous state to the fuel injection system 18. The fuel is typically a gas or a supercritical fluid once it arrives at the fuel injection system, but may still be relatively cold.

Figure 2:
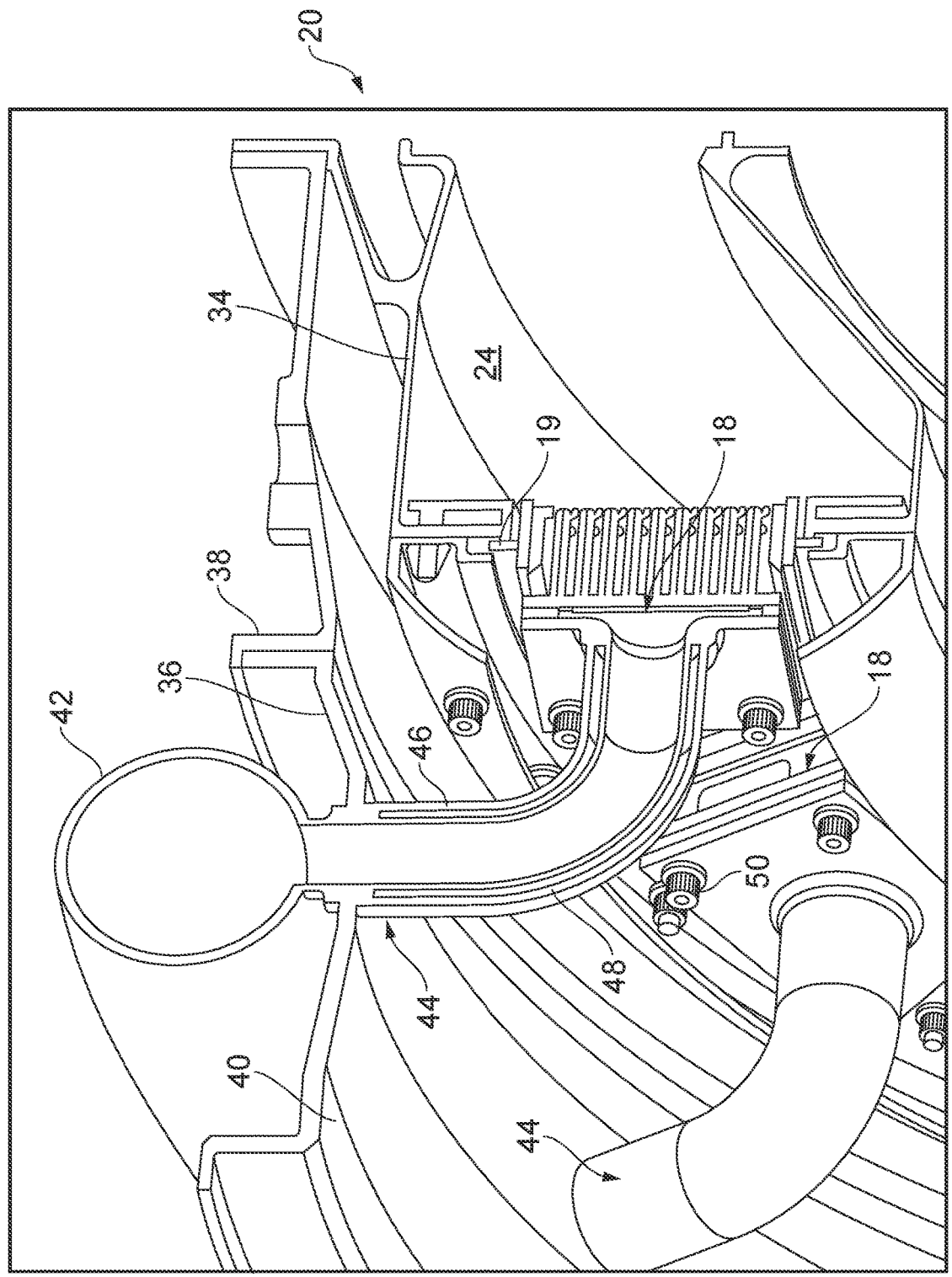
FIG. 2 is an isometric view from a rear of part of a combustor for the engine of FIG. 1.

Elements of a first embodiment of the combustor 20 is shown in further detail in FIG. 2.

The combustor 20 comprises a plurality of fuel injectors 18, which are arranged in an annular configuration. The combustor 20 comprises a combustion chamber defined by radially inner 34 and outer 36 casings which extend annularly around the circumference of the combustor 20, and axially toward an outlet adjacent the high-pressure turbine 22. In use, fuel flows into the combustion chamber through the fuel injectors 18, while air flows into the combustion chamber both through apertures 19 provided in the fuel injectors 18, and through dilution holes (not shown) in the combustion chamber inner wall 34. Substantially all combustion takes place within the inner casing 34, with the outer casing 36 providing structural support and cooling air.

The combustion chamber outer casing 36 is a structural component, which forms part of the engine core outer casing, and bears flights loads in use. As such, the outer casing 36 is stiff, but may flex somewhat in use due to flight loads. The combustion chamber outer casing 36 comprises several components which are integrally formed. As will be understood, each of the integrally formed components are either produced as a single item, or are joined to form an integral whole. For example, the outer casing 36 may be formed by machining a unitary billet of material. Suitable processing methods include Computerised Numerical Control (CNC) machining, and other similar processes. Other suitable processes include near-net-shape processes, such as sintering, or additive manufacturing processes such as selective laser sintering (SLS). A combination of such processes may be used. In other cases, the combustion chamber outer casing 36 may be formed from separate sub-assemblies, and subsequently permanently joined together to form a unitary whole without removable fasteners. For example, the combustion chamber outer casing 36 may be joined by welding. Accordingly, no seals or joints need be present in the unitary combustion chamber outer casing 36.

The combustion chamber outer casing 36 comprises a generally cylindrical pressure chamber, configured to provide an air-tight containment for combustor entry air in use, and is joined to upstream and downstream engine components by joints 38. An annular wall 40 of the casing 36 is in direct contact with (i.e. is gas-washed with) compressor exit/combustor entry air in use.

At a radially outer side of the annular wall 40 is a generally toroidal hydrogen fuel manifold 42. The manifold 42 is supplied with hydrogen from the tank 19 via an inlet port (not shown) by a coupling. Consequently, a single (or relatively few) couplings are required to link the hydrogen tank 19 to the fuel supply. Typically, the manifold 42 is configured to be supplied with hydrogen in a gaseous or a supercritical state, at a pressure adequate to supply the fuel injectors 18.

The manifold 42 is integral with the combustion chamber outer casing, and is joined to the outer casing wall 40 by a plurality of feed arms 44. Each feed arm 44 extends between the manifold and a respective fuel injector 18 through the annular wall 40. Since the annular wall 40, manifold 42 and feed arms 44 are formed of a single integral part, no joints, seals or fasteners penetrate the outer wall 40, which aids in maintaining a gas tight seal in operation.

The manifold 42 is spaced from the outer casing wall 40 by a section of the feed arm 44 which extends from the radially outer side of the outer casing wall 40. Accordingly, the relatively cold manifold 42, which is cooled by the cold hydrogen therein, is spaced from the outer wall 40, which is subject to high temperatures by contact with the combustor entry air. Accordingly, thermal stress is reduced.

The feed arm 44 portion which extends from the radially outer side of the outer casing wall 40 is typically single-walled, in view of the relatively low temperature environment. Additionally, the single wall can be relatively flexible, which allows for differential thermal expansion. Optionally, features such as undulations (not shown) in the feed arm 44 may be provided, to further reduce stiffness of the feed arm 44, and so permit movement of the manifold 42 relative to the outer casing wall 40.

The feed arm 44 portion which extends from the radially inner side of the outer casing wall, which extends to the injector 18, is double-walled, having inner 46 and outer 48 tubular walls. The walls 46, 48 are spaced by an air gap through at least part of their length, such that thermal insulation is provided between the walls. Consequently, thermal expansion and contraction caused by the close proximity between the relatively cold hydrogen and the relatively hot combustor entry air is reduced.

Preferably, the inner wall 46 has a reduced stiffness, i.e. a greater flexibility than the outer wall 48. This reduced stiffness may be provided by the reduced diameter of the inner wall 46 relative to the outer wall, and/or reduced wall thickness and geometric features such as undulations. Consequently, the inner wall 46 can flex due to temperature fluctuations and differentials, while the outer wall 48 provides structural strength and resistance to damage from FOD.

Each fuel injector 18 is coupled to the feed arm 44 by a coupling comprising a plurality of removable fasteners 50, which are provided at an axially forward end of the injectors 18, within the envelope defined by the combustor outer casing 36 and the inner casing 34. Consequently, individual fuel injectors 18 can be removed for maintenance, without removing the whole combustor 20. On the other hand, the joint between the injectors 18 and the feed arm 44 represents a potential leak risk. However, since the joint is provided within the outer casing 36, any leaks will flow into the combustor, where the hydrogen can be safely burned.

Figure 3:
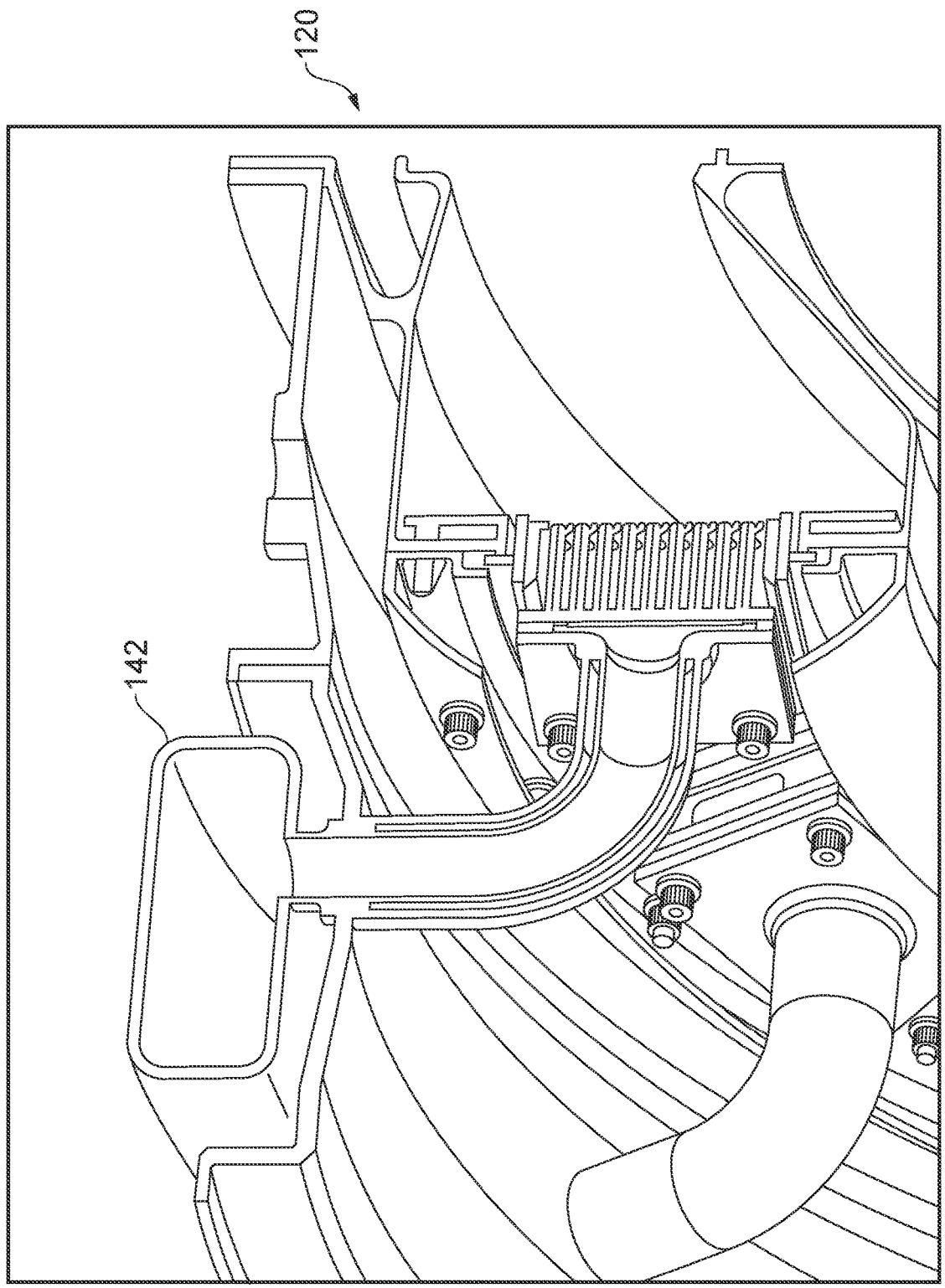
FIG. 3 is an isometric view from a rear of part of a first alternative combustor for the engine of FIG. 1.

FIG. 3 illustrates an alternative combustor 120. The combustor 120 is similar to the combustor 20, differing only in the shape of the manifold 142. In the embodiment of FIG. 3, the manifold 142 forms an annulus having a box section, having rounded corners, as shown in FIG. 3. Consequently, the manifold 142 is more space efficient than the arrangement shown in FIG. 2. This is particularly advantageous, given that the area within the engine where the manifold is located is typically heavily populated with engine hardware.

Figure 4:
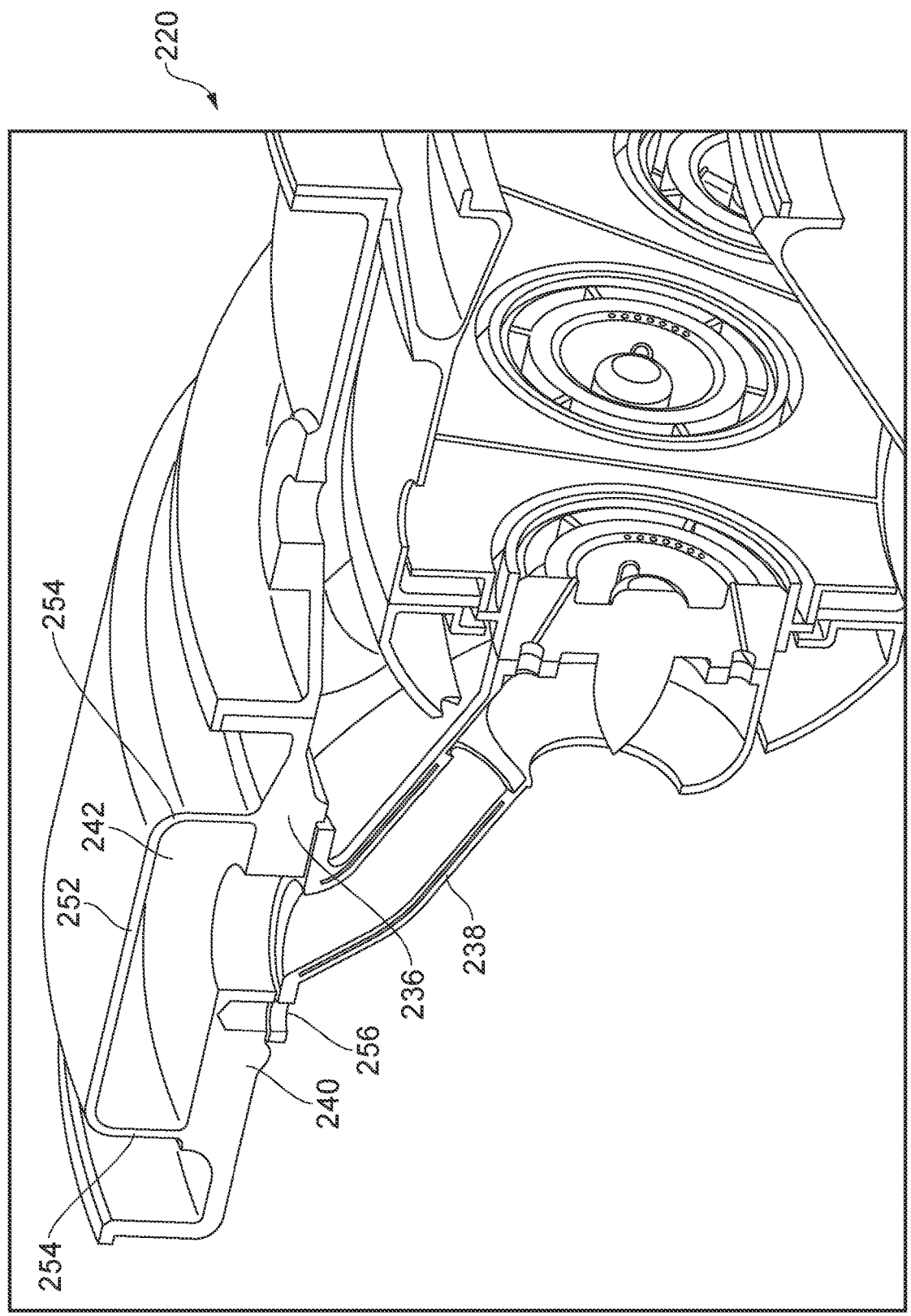
FIG. 4 is an isometric view from a front of part of a second alternative combustor for the engine of FIG. 1.

FIG. 4 shows a further alternative combustor 220. This embodiment differs from the first embodiment in two major ways.

Firstly, the fuel manifold 242 is configured differently. Rather than being toroidal, and spaced from the combustor outer wall, the combustor outer wall 240 of the casing 236 forms the radially inner wall of the fuel manifold 242, such that fuel within the manifold 242 is in contact with the combustor outer wall 240 in use. This design may save weight relative to the first embodiment. Additionally, hydrogen fuel within the fuel manifold 242 may cool the outer wall of the combustor, thereby reducing thermal stresses within the combustion system. Such an arrangement also further reduces the volume occupied by the fuel manifold 242.

A radially outer wall 252 of the fuel manifold 242 is radially spaced from the inner wall 240, and is generally cylindrical. Side walls 254 extend radially from axially upstream and downstream ends, such that the manifold 242 is generally annular, having a box section. Such an arrangement forms a relatively stiff construction, thereby contributing to the stiffness of the casing. As such, the manifold 242 forms an integral structural component, thereby providing further weight savings.

A second difference between the embodiments of FIGS. 2 and 4, is the provision of a coupling 256 between the manifold 242 and feed arms 238. The coupling 256 is provided at the radially inner side of the combustor wall 240, within the combustor casing 236 envelope. Typically, the coupling comprises through holes provided in the feed arm 238, which coincide with threaded blind holes provided in the combustor casing outer wall 240, into which bolts are threaded. Consequently, the feed arms 238 can be removed separately to the combustor outer casing 236, which may be convenient for maintenance. Nevertheless, the coupling 256 is provided within combustor casing 236, ensuring that any fuel leaks leak into the combustor, rather than other spaces of the engine where the fuel may represent a fire risk.

Figure 5:
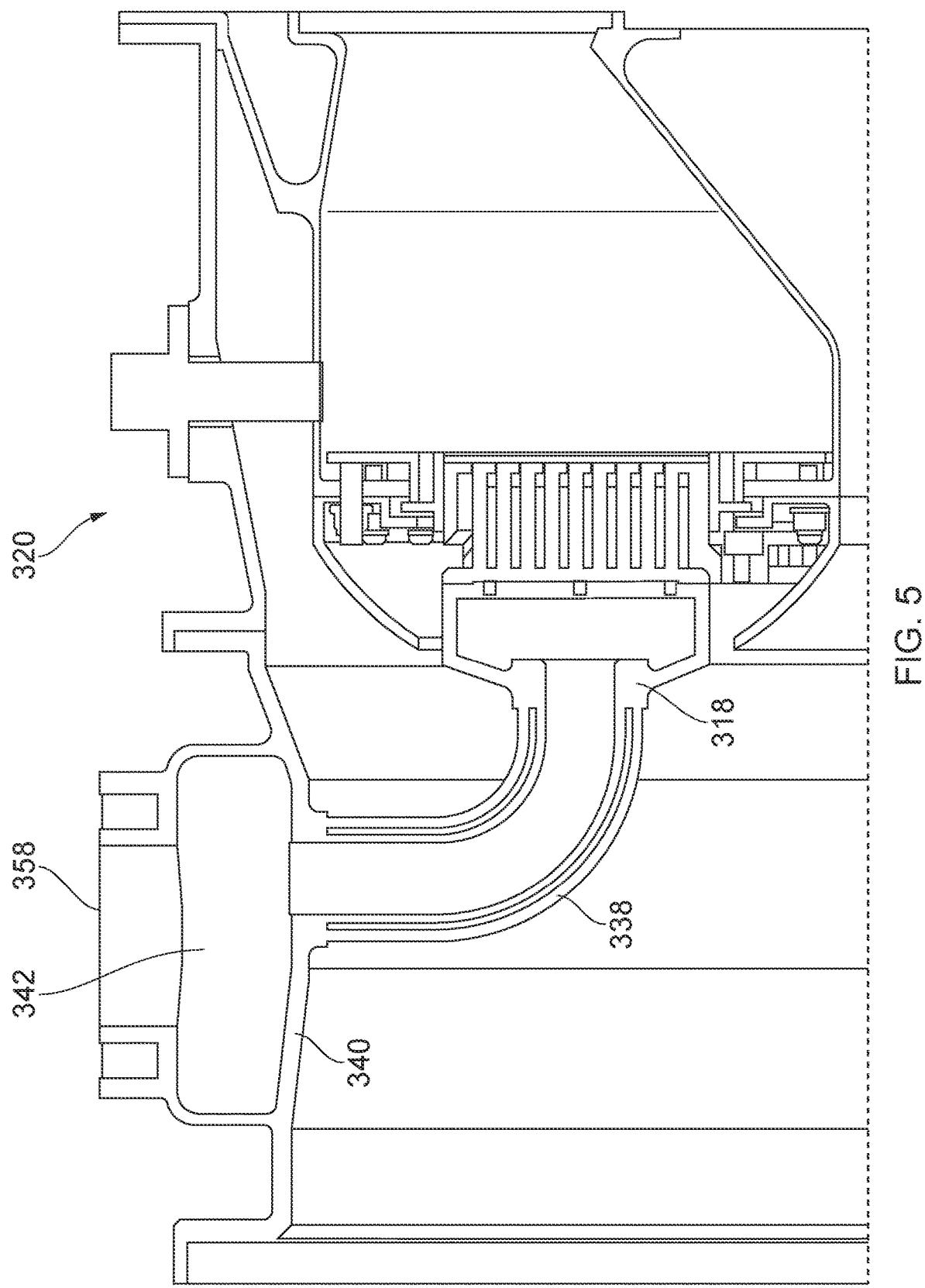
FIG. 5 is a cross-sectional view from the side of a third alternative combustor of the engine of FIG. 1.

FIG. 5 shows a further embodiment, which combines features of the embodiments of FIGS. 3 and 4. The fuel manifold 342 is similar to that of FIG. 4, in which the combustor casing outer wall 340 forms an inner wall of the manifold 342. However, in this embodiment, the feed tube 338 is integral with the manifold 342 and casing 336, with no coupling being provided between the two. FIG. 5 also illustrates the inlet port 358, which provides fuel to the manifold 342. This configuration presents a sealed fuel system with only one mechanical connection to the main fuel delivery pipe, minimising the chance of fuel leakage.

Figure 6A:
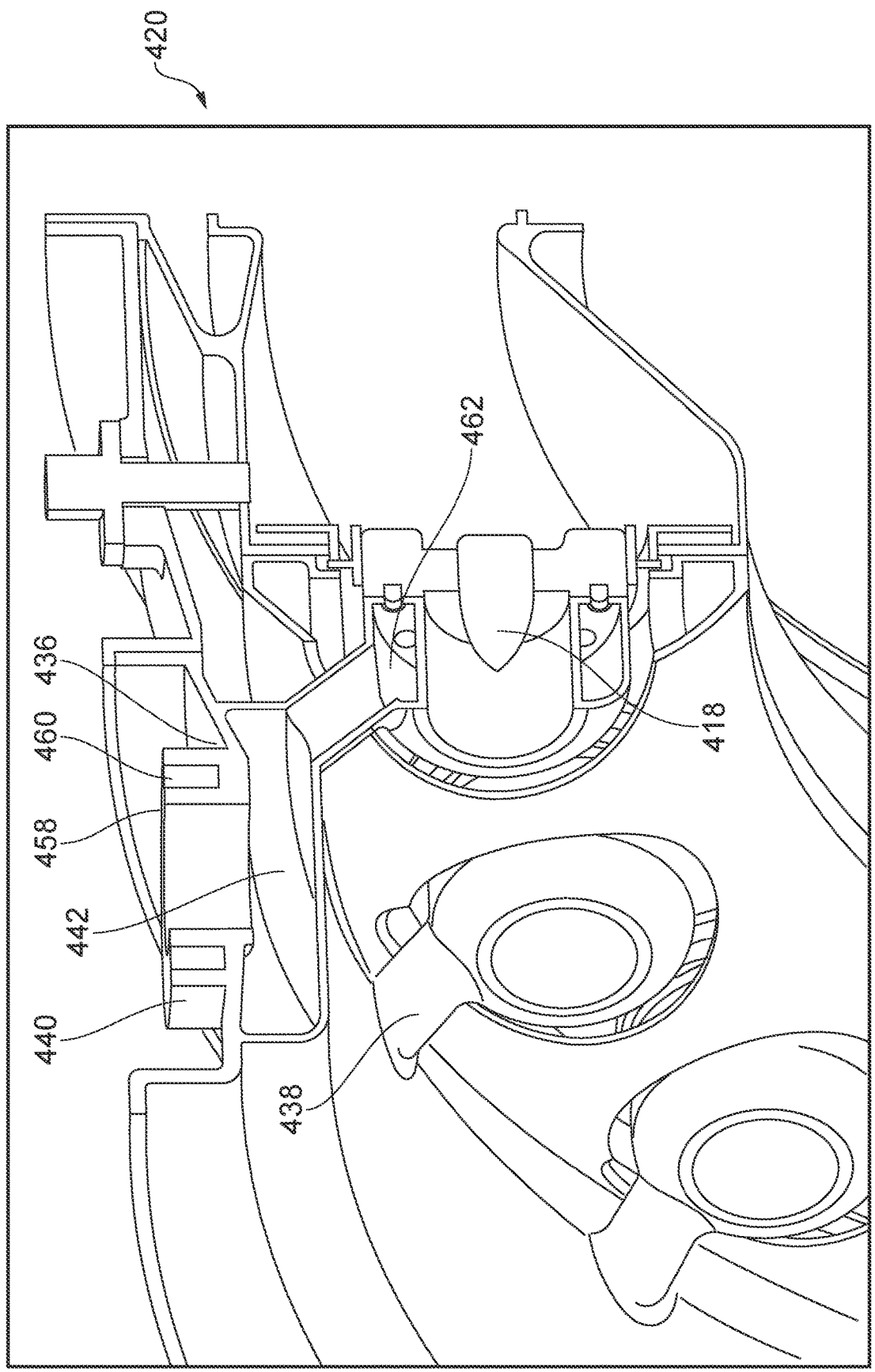
FIG. 6A is an isometric view from a front side of a fourth alternative combustor of the engine of FIG. 1.
Figure 6B:
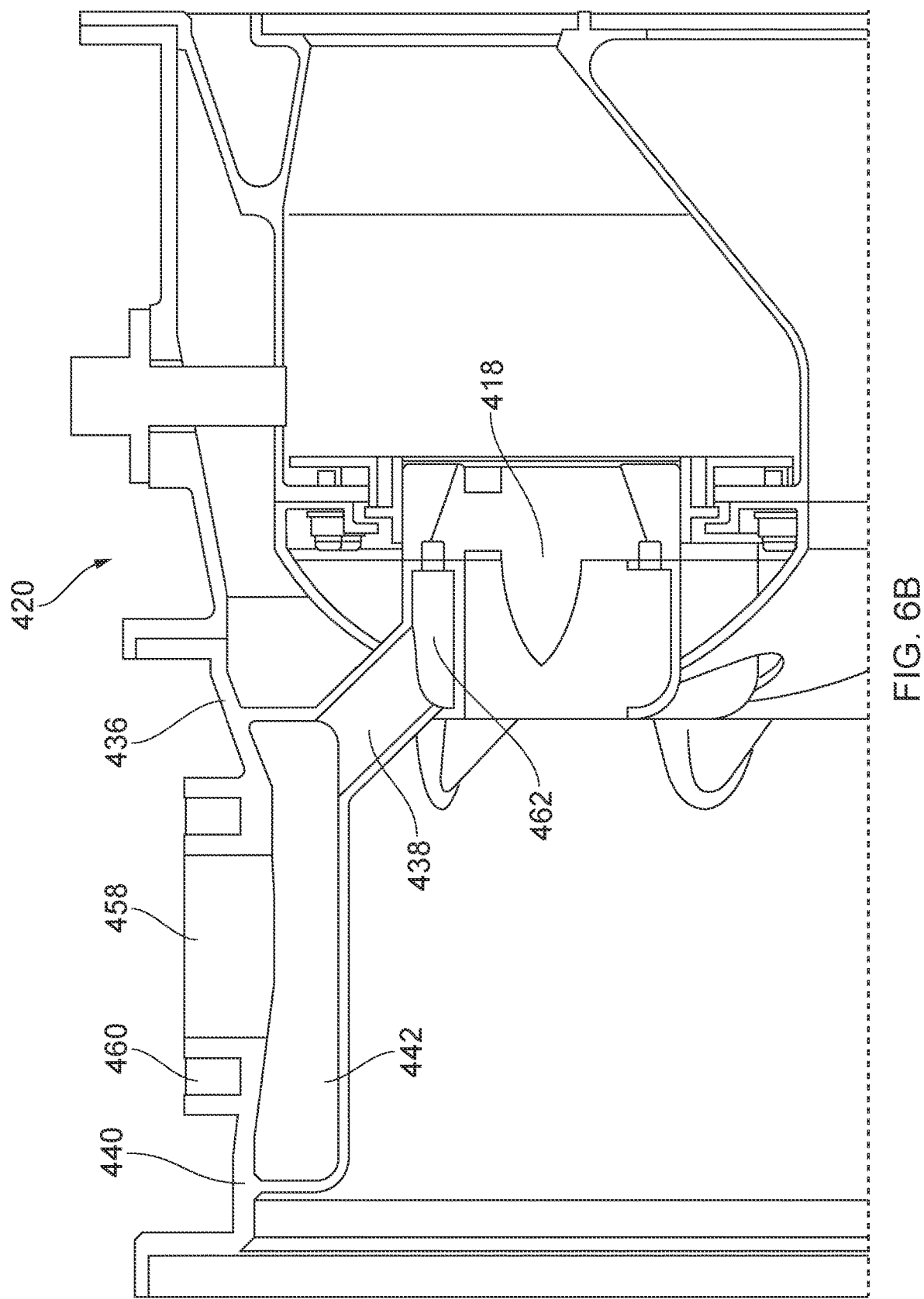
FIG. 6B is a cross sectional view from the side of a fourth alternative combustor of the engine of FIG. 1.

FIGS. 6A and 6B illustrate a still further embodiment of a combustor 420. In this embodiment, the manifold 442, combustor outer casing 436, feed arm 438 and at least part of the injectors 418 are integrally formed. In this embodiment, the combustor casing 436 forms the radially outer wall 452 of the manifold 442, such that the manifold 442 is contained within the combustor outer casing 436, within the structural outer wall 440 of the combustor casing 436. The inlet port 458 is provided at a radially outer wall of the manifold, and is coupled to the fuel line 17 by a coupling 460.

In this embodiment, the manifold 442 is internal to the combustion chamber and therefore does not occupy the space within the volume surrounding the combustor outer casing 436, which may be at a premium. Consequently, this design is more volumetrically efficient, unless space within the combustor casing 436 is at a higher premium. An internal fuel manifold is also potentially safer than an external manifold, since any fuel will immediately automatically ignite. In the zone outside of the combustion chamber the temperature is typically not sufficient to automatically ignite the fuel, so any leaked fuel may collect and form an explosive pocket in the engine zone. Additionally, the feed arms 438 can be shorter, thereby resulting in a weight saving. Finally, the hydrogen fuel dwells within the manifold 442, which is surrounded by relatively hot high-pressure compressor exit air, and separated by the relatively thin, non-structural walls of the manifold 442. As such, the hydrogen is heated, which may reduce the heating requirement of hydrogen fuel upstream (which may be energy intensive and inefficient).

Each injector 418 also differs from the previous designs. Each injector 418 includes a second annular fuel manifold 462, which supplies a plurality of fuel ports in each injector. The injectors 418 may be wholly integrally formed with the feed arm 438, manifold 442 and combustor casing 436, which may reduce production and assembly costs, or only part of each injector may be integrally formed. In a similar manner to the embodiment shown in FIG. 5, this configuration presents a sealed fuel system with only one mechanical connection to the main fuel delivery pipe, minimising the chance of fuel leakage.

Figure 7:
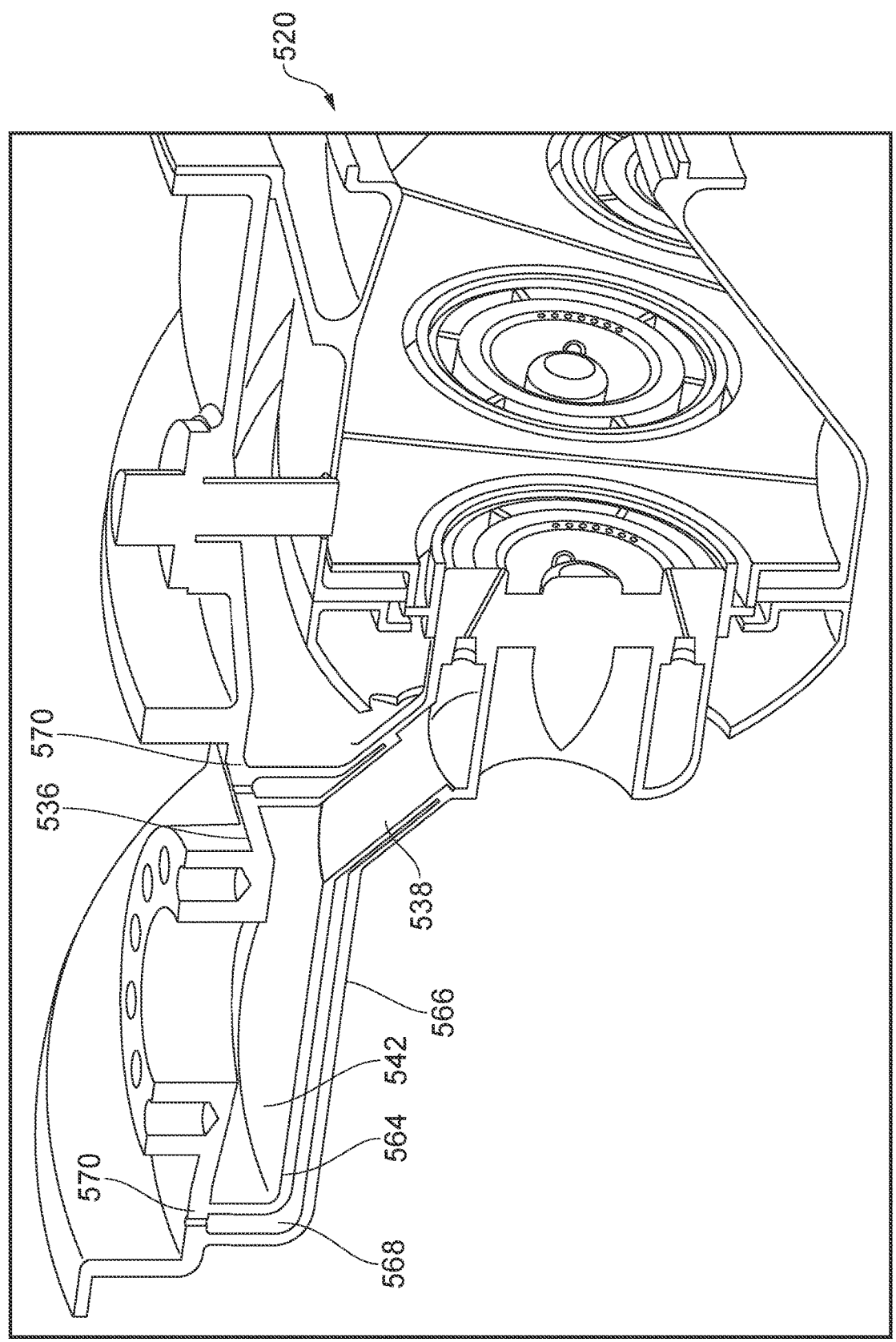
FIG. 7 is an isometric view from a rear of part of a fifth alternative combustor for the engine of FIG. 1.

Finally, FIG. 7 shows a still further embodiment of the fuel injector 520. This embodiment is similar to the fuel injector 420, but the manifold 542 and feed arms 538 are modified to include a double-walled structure comprising inner 564 and outer 566 walls, which extend around the inner wall of the manifold 542 and the feed arms, within a combustor casing 536 to form an air gap 568. Ports 570 are provided at a radially outer end and in communication with the air gap 570, which permit "zone 3" air from outside of the casing 536 to circulate within the air gap 570. The double wall provides additional safety from foreign body impact damage. It also provides better thermal transition and reduces thermal stresses in the walls as a result of the temperature difference between the inner zone and out zone. Additionally, the temperature of the hydrogen within the feed arm 538 and manifold 542 can be controlled by controlling air flow through the air gap.

Any of the features disclosed herein may be employed separately or in combination with any other features and thus the disclosed subject-matter extends to and includes all such combinations and sub-combinations of the or more features described herein. Alternative embodiments of the disclosed design are also envisaged.

For example, the manifolds, fees arms and injectors could be single-walled or double-walled. Other construction methods could be employed.

The invention claimed is:

1. A gas turbine engine configured to combust gaseous hydrogen fuel, the gas turbine engine comprising:
   a combustor comprising an annular combustion chamber outer casing surrounding an inner combustor case and a fuel manifold configured to provide gaseous fuel to a plurality of fuel injectors; wherein
   the fuel manifold is formed integrally with the combustion chamber outer casing;

the fuel manifold is provided on a radially inner side of the combustion chamber outer casing; and the fuel manifold comprises an inner and an outer wall to provide an air gap therebetween, the outer wall being washed by combustor inlet air in use.

2. A gas turbine engine according to claim 1, wherein each of the combustion chamber casing, fuel manifold, feed arms and at least part of the plurality of fuel injectors are formed integrally.

3. A gas turbine engine according to claim 1, wherein the air gap is in fluid communication with compressor air.

4. A gas turbine engine according to claim 1, wherein the fuel manifold comprises a box section.

\* \* \* \* \*